United States Patent
Hosie et al.

(10) Patent No.: US 10,171,431 B2
(45) Date of Patent: Jan. 1, 2019

(54) SECURE MESSAGE HANDLING OF AN APPLICATION ACROSS DEPLOYMENT LOCATIONS

(71) Applicant: International Business Machines Corporation, Armonk, NY (US)

(72) Inventors: John Hosie, Eastleigh (GB); Daniel J. McGinnes, Southampton (GB); Martin A. Ross, Gosport (GB); Craig H. Stirling, Hedge End (GB); Dominic J. Storey, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 15/271,313

(22) Filed: Sep. 21, 2016

(65) Prior Publication Data
US 2018/0083924 A1    Mar. 22, 2018

(51) Int. Cl.
H04L 29/06    (2006.01)
H04L 29/08    (2006.01)
H04L 12/58    (2006.01)

(52) U.S. Cl.
CPC ........ H04L 63/0428 (2013.01); H04L 51/063 (2013.01); H04L 63/102 (2013.01);
(Continued)

(58) Field of Classification Search
CPC ... H04L 63/0428; H04L 51/36; H04L 63/102; H04L 67/2804; H04L 67/36
See application file for complete search history.

(56) References Cited

U.S. PATENT DOCUMENTS 7,607,126 B2 * 10/2009 Read .................. G06F 8/656
717/172
8,108,912 B2    1/2012 Ferris
(Continued)

FOREIGN PATENT DOCUMENTS

EP    2947569    11/2015

OTHER PUBLICATIONS

Huang et al., Efficiently Secure Data Privacy on Hybrid Cloud, URL: http://ieeexplore.ieee.org/xpl/articleDetails.jsp?arnumber=6654806, Source: Jun. 9-13, 2013, pp. 1936-1940.
(Continued)

*Primary Examiner* — Techane Gergiso
(74) *Attorney, Agent, or Firm* — Schmeiser, Olsen & Watts, LLP; Scott Dobson

(57) ABSTRACT

A method and system for secure message handling of an application across deployment locations. The application is divided into multiple processing nodes which process messages and can be deployed in multiple different locations. The application is analyzed to identify processing nodes referencing given data aspects having deployment constraints. It is ascertained whether one or more data aspects of the given data aspects are accessed by an identified processing node. If so, a restriction is determined for the identified processing node based on the deployment constraints of the accessed one or more data aspects and the identified processing node of the application is deployed according to the determined restriction for the identified processing node. If not, the identified processing node or a preceding processing node is marked to indicate a required tokenization of the one or more data aspects, wherein the tokenization removes the deployment constraints for the identified processing node.

14 Claims, 9 Drawing Sheets

(52) U.S. Cl.
CPC ........ *H04L 63/105* (2013.01); *H04L 67/2804* (2013.01); *H04L 67/22* (2013.01)

(56) References Cited

U.S. PATENT DOCUMENTS

| | | | |
|---|---|---|---|
| 8,843,998 | B2 | 9/2014 | Fu et al. |
| 8,984,132 | B2 | 3/2015 | Sailer et al. |
| 9,021,135 | B2 | 4/2015 | Ang et al. |
| 9,069,599 | B2 | 6/2015 | Martinez et al. |
| 9,462,056 | B1* | 10/2016 | Protopopov ........ H04L 67/2838 |
| 9,880,757 | B1* | 1/2018 | Banerjee ................ G06F 3/0619 |
| 2001/0034743 | A1* | 10/2001 | Thomas ................ G06F 17/3089 715/234 |
| 2012/0159459 | A1* | 6/2012 | Turner .................... G06F 8/314 717/138 |
| 2012/0209749 | A1* | 8/2012 | Hammad ................ G06Q 30/06 705/27.1 |
| 2012/0324528 | A1* | 12/2012 | Ferracane ................ H04L 67/02 726/1 |
| 2014/0040857 | A1* | 2/2014 | Trinchini .................. G06F 8/71 717/109 |
| 2014/0359047 | A1 | 4/2014 | Lee et al. |
| 2014/0136832 | A1 | 5/2014 | Klum et al. |
| 2014/0188879 | A1* | 7/2014 | Welinder .......... G06F 17/30997 707/736 |
| 2014/0258983 | A1* | 9/2014 | Inamdar ................ G06F 17/248 717/121 |
| 2014/0337276 | A1* | 11/2014 | Iordanov ............... G06F 9/4435 707/602 |
| 2015/0089474 | A1* | 3/2015 | Jain .................... G06F 9/45525 717/121 |
| 2015/0106881 | A1 | 4/2015 | Wharton et al. |
| 2015/0156131 | A1 | 6/2015 | Pomerantz |
| 2015/0163285 | A1 | 6/2015 | Chakra et al. |
| 2015/0248664 | A1* | 9/2015 | Makhdumi ........ G06Q 20/3274 235/380 |
| 2017/0034023 | A1* | 2/2017 | Nickolov ............. H04L 43/0817 |
| 2017/0046530 | A1* | 2/2017 | Raj ..................... G06F 21/6218 |
| 2017/0278098 | A1* | 9/2017 | Castinado .............. G06Q 20/42 |

OTHER PUBLICATIONS

Method and Apparatus for Partitioning Applications for the Interoperability Enablement of Hybrid (Public and Private) Cloud, Source: IPCOM000235888D Publication Date: Mar. 28, 2014, 4 pages.

Ahmadian et al., Security of Applications Involving Multiple Organizations and Order Preserving Encryption in Hybrid Cloud Environments, Source: May 19-23, 2014, URL: http://ieeexplore.ieee.org/xpl/articleDetails.jsp?arnumber=6969476, pp. 894-903.

Dave Shackleford, Cloud Tokenization, Retrieved from Internet Sep. 20, 2016, URL: http://searchcloudsecurity.techtarget.com/tip/Cloud-tokenization-Why-it-might-replace-cloud-encryption, 3 pages.

Tokenization of on Premise Data to Utilize in Community Management Services Source: IPCOM000210107D Publication Date: Aug. 25, 2011, 3 pages.

Cloud Tokenization Primer, Retrieved from Internet Sep. 20, 2016, URL: http://perspecsys.com/resources/cloud-tokenization-primer/, 4 pages.

U.S. Appl. No. 15/271,378, filed Sep. 21, 2016.

* cited by examiner

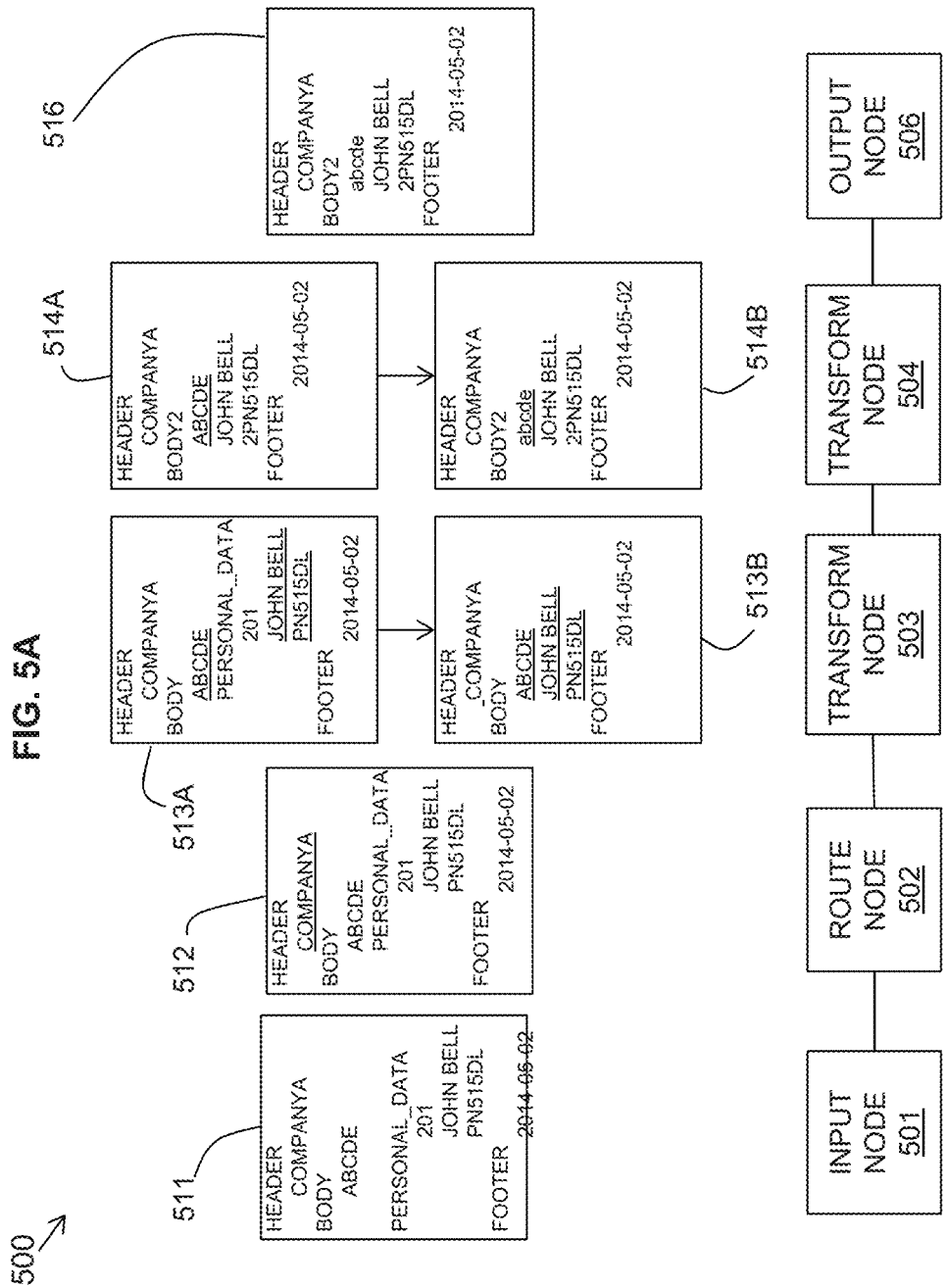

US 10,171,431 B2

SECURE MESSAGE HANDLING OF AN APPLICATION ACROSS DEPLOYMENT LOCATIONS

TECHNICAL FIELD

The present invention relates to secure deployment of an application across deployment locations, and more specifically, to include tokenization of data aspects.

BACKGROUND

Products such as IBM® Integration Bus provide options for a universal integration foundation based on enterprise service bus (ESB) technology. Implementations help to enable connectivity and transformation in heterogeneous information technology environments for businesses of any size, in any industry and covering a range of platforms including cloud and mainframe servers.

Certain integration flows may be performing actions on messages containing sensitive data, which will likely have restrictions associated with where that data can flow. For instance, certain data may need to stay within a company firewall or not be allowed to go out of the country.

Utilizing cloud technologies enable companies to scale elastically to cope with demand, reduce and rationalize information technology infrastructure, reduce cost of operations and deploy systems faster, easier and on-demand.

Certain end-to-end integrations or services may be running in hybrid cloud environments where some processing is performed in a public cloud space and some parts, that may be using secure data, are run on-premise within the company firewall.

A simple and easy to use deployment model is needed for customers wanting to deploy an integration to a hybrid cloud environment.

SUMMARY

Embodiments of the present invention provide a method, and an associated computer system and computer program product, for secure message handling of an application across deployment locations. One or more processors of the computer system divide the application into multiple processing nodes which process messages and which can be deployed in multiple different locations, wherein annotations are provided defining constraints on the handling of data in given data aspects. The one or more processors analyze the application to identify processing nodes of the multiple processing nodes that reference the given data aspects having deployment constraints. The one or more processors ascertain whether one or more data aspects of the given data aspects having deployment constraints are accessed by an identified processing node of the multiple processing nodes, wherein access to each data aspect requires a value of each data aspect to be known. If the ascertaining ascertains that the one or more data aspects are accessed by the identified processing node, then the one or more processors determine a restriction for the identified processing node based on the deployment constraints of the accessed one or more data aspects and deploy the identified processing node of the application according to the determined restriction for the identified processing node If the ascertaining ascertains that none of the one or more data aspects are accessed by the identified processing node, then the one or more processors mark the identified processing node or a preceding processing node that precedes the identified processing node to indicate a required tokenization of the one or more data aspects, wherein the tokenization removes the deployment constraints for the identified processing node.

BRIEF DESCRIPTION OF THE DRAWINGS

The present invention, both as to organization and method of operation, together with objects, features, and advantages thereof, may be understood by reference to the following detailed description when read with the accompanying drawings.

FIGS. 5A and 5B are schematic diagrams of an example of a message flow deployment in an integration environment illustrating a method, in accordance with embodiments of the present invention.

Figure 1:
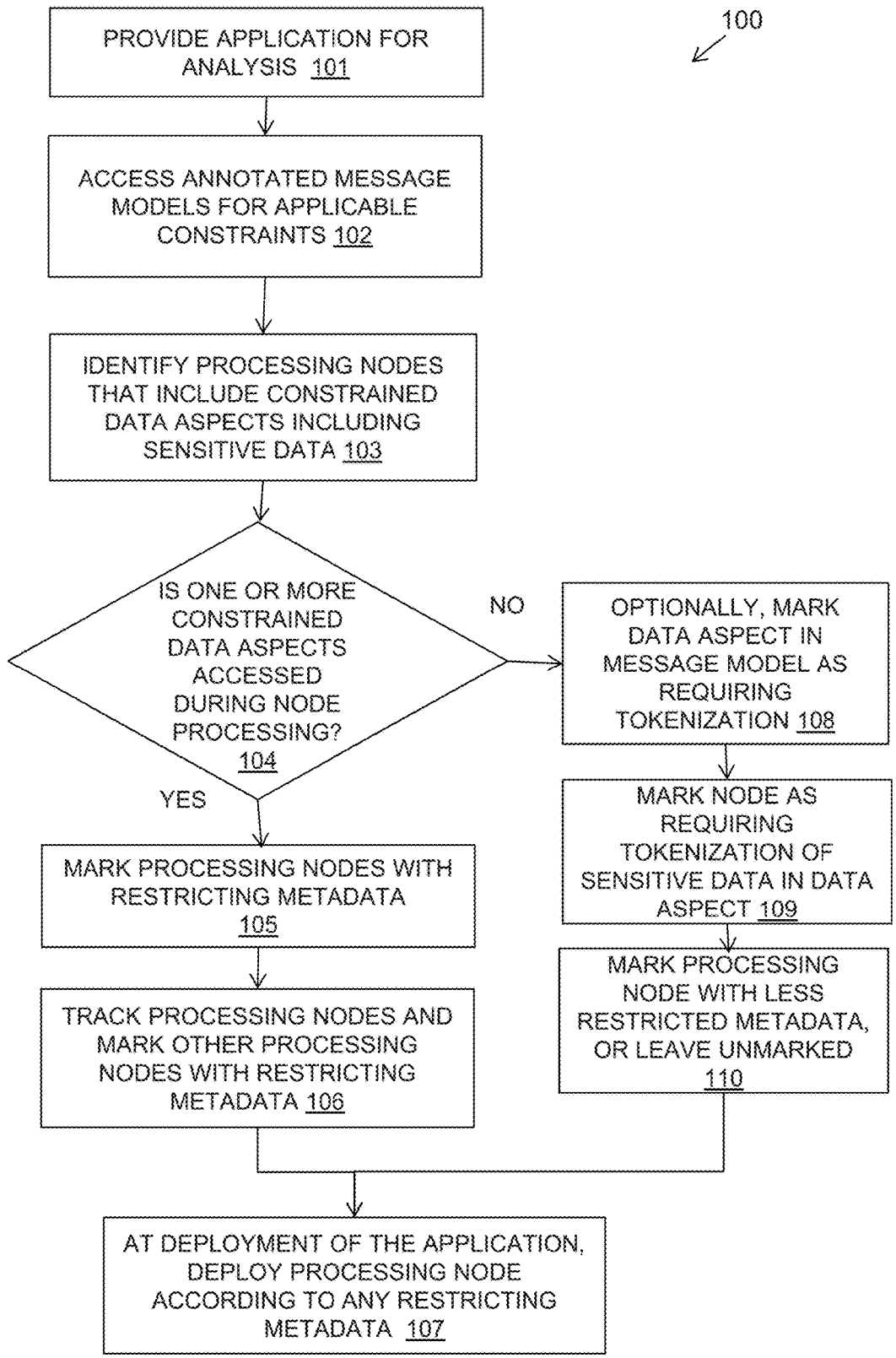
FIG. 1 is a flow diagram of a method for secure message handling of an application that may be deployed across multiple locations in multiple systems, in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Information may be required to flow between disparate applications across multiple hardware and software platforms. One architecture that supports this is Enterprise Service Bus architecture providing integrated connectivity between applications and services in a service-oriented architecture. IBM® Integration Bus (formerly Websphere® Message Broker) is an example of such an architecture, which allows business information to flow as an integration application with rules applied to the data flowing through an integration node (also referred to as a message broker) to route and transform the information.

Other architectures may include distributed computing in which a distributed system is a software system in which components are located on networked computers and communicate and coordinate their actions by passing messages. Distributed applications may be processed across a distributed computing architecture.

The described method and system are described in the field of integration flows or applications, which may be deployed across different locations including using a hybrid cloud environment or cloud-bursting in times of high demand. However, it will be appreciated by a person skilled in the art that equivalent methods and systems may be applied to a distributed computing environment.

In the described method and system, a description or model of a data structure, which may be for example in the form of a message model, is annotated to identify data aspects that include sensitive data. The data aspects may include aspects, such as fields or structures, or elements within the structures. The sensitive data may be identified by annotations labeling the sensitive data or by interpreting restrictions on the locations in which the data aspects may be deployed. For instance, data within a data aspect such as a particular field or structure may be restricted to a company premises, restricted to within a company firewall, restricted to a country, or may be un-restricted and free to enter the public cloud.

An integration application may be analyzed to determine what data aspects the particular processing of the application is acting on and whether the processing of the application is accessing the data aspects including sensitive data or whether the data aspects are just present in the message tree. Accessing data aspects is defined as instances where the value of the field is required in the function being performed on the field.

If particular logic of a processing node is acting on a message tree where the data aspects including sensitive data are present but are not being accessed, then this logic may still be deployed to a public cloud environment if, prior to leaving a secure environment such as the company firewall, the data is masked by replacing the sensitive data with tokenized data. The tokenized data may be subsequently restored back to the sensitive data when again within the secure environment. As the data aspects containing sensitive data are not actually read or accessed, the sensitive data can be replaced by tokenized data and the processing of the application can be carried out, which enables processing nodes of an application to be deployed in less secure environments, such as in a cloud, where otherwise the processing nodes may have been constrained to be processed in a secure environment such as on premise. The processing nodes may be marked as requiring tokenization of data aspects.

If particular logic of a processing node is acting on a message tree where data aspects including sensitive data are accessed, then the processing node's deployment may be restricted. The analysis may identify processing nodes that have restrictions provided in the message model and which have been analyzed to determine that the data aspects are accessed. These restrictions may be applied to the processing nodes having accessed sensitive data aspects. The restrictions may restrict the processing to certain locations or categories of locations corresponding to the restrictions defined in the message model. The processing nodes may be marked with metadata indicating the restriction.

The analysis and restricting metadata marking may be carried out as the application is developed and packaged with the restricting metadata and tokenization requirement being marked in the nodes of the application. Alternatively, the restricting metadata marking may be performed at deployment time of the application in which case the restriction metadata may not be marked at a node and instead the node may be deployed according to the applicable restriction; however, the tokenization requirement is marked in the nodes of the application to be carried out at runtime of the nodes.

When the integration application is deployed, the processing nodes are deployed appropriately within the environment based on the data aspects the processing nodes are processing and whether the data aspects are accessed. When the integration application is then run, any data aspects which are marked as requiring tokenization may be masked while in a secure environment and a mapping provided between the token and the sensitive data. The tokenization may be reversed when the data aspects are returned to the secure environment by looking up the mapping.

Advantageously, a Chief Information Security Officer (CISO) or other appropriate administrator may set restrictions on data security up-front which are then applied to the message model. The restrictions may identify data aspects as including sensitive data and/or restrictions as to the deployment of such sensitive data. Subsequently the application or integration developer and administrators do not need to have in-depth knowledge of what restrictions there are on the data, which makes development and administration of applications in a hybrid cloud environments more efficient, reducing costs and complexity.

The method describes augmenting the message model, and using the augmented message model, in coordination with application analysis to determine appropriate deployment locations for different parts of a distributed application and subsequently where processing should take place. The described method and system provide a logical break between the message model and the code such that the developer does not need to know about restrictions on data propagation since the restrictions on the data propagation are set at the message model level by appropriate architects. Message models in general provide a separation between the code and the description of the message. This separation is used to advantage in the deployment of applications accessing secure data to hybrid cloud environments.

FIG. 1 is a flow diagram 100 of a method for secure message handling of an application that may be deployed across multiple locations in multiple systems, in accordance with embodiments of the present invention.

As a preliminary step, message models may be annotated with constraints to indicate data aspects that contain sensitive data and/or provide restrictions to the use of such data in aspects of a message.

The aspect of the message to which the constraint is applied may be a whole message, a complex element (which may contain child complex elements or simple elements/fields), or individual elements or fields of a message. The restrictions may be provided as constraints in the message model that define where the data may be deployed. Annotating the message model may identify data fields or structures that need to stay within boundary X, boundary Y, etc. (i.e. within a department, a firewall, a country, etc.).

A message model provides an annotated model of a message format, for example, a message model may be an annotated Extensible Markup Language (XML) Schema model or a Data Format Description Language (DFDL) schema model. If creating a message model, an administrator may create an element or field and may set a property on the element or field to specify a constraint. If an existing message model is being modified, the administrator may modify existing elements or fields by setting an appropriate constraint property.

An application when being developed may pull message models into the application flow for use by nodes or subsets of the application that process messages defined by the message models.

An application may be provided (step 101) for analysis at development of the application. The application may have processing nodes or code subsets that may be deployed across multiple systems that may, for example, be distributed across a network, or a hybrid cloud environment.

Analysis is carried out of the application and the analysis may access (step 102) the annotated message models in which aspects of the message, such as data fields, elements and/or data structures, have been annotated with constraints to obtain details of the restrictions on deployment locations of the data in the fields, elements and/or structures.

The analysis may identify (step 103) processing nodes of the application that reference data aspects such as fields, elements or structures or process messages with constraints imposed in their message model. The constraint may be simply identifying the data aspect as including sensitive data, or may include a constraint in the form of a restriction as to where the data aspect may be performed. A restriction as to where the data aspect may be performed may be interpreted as indicating that the data aspect includes sensitive data.

For a processing node that references at least one data aspects with constraints, the method may determine (step 104) if one or more data aspects having constraints are accessed during node processing. Access to data aspects requires a value of the data aspect to be known.

This analysis looks to see what possible locations the application processing nodes can be deployed to. If data values are needed and are restricted, the application processing nodes can only be deployed to a restricted environment. If the data aspects are not accessed, the application processing nodes could be deployed to a restricted or public environment and tokenization used.

If one or more data aspects are accessed by a processing node (YES branch from step 104), a restriction for the processing node may be provided and marked as metadata for the node (step 105) based on the constraints of the accessed data aspects. If the constraint includes a deployment constraint, the processing node may be marked with the deployment constraint. If the processing node includes more than one data aspect with a deployment constraint, the most restricted form of deployment constraint may be applied to the processing node.

If none of the data aspects having constraints in a processing node are accessed (NO branch from step 104), the method may optionally annotate 108 in the message model the data aspects that require tokenization for reference at runtime of the processing node. However, this annotation is not required as there is already annotation in the message model showing the constraint that the runtime may interpret in this way. The requirement for tokenization comes when moving from a secure to less secure environment and is therefore dependent on the deployment topology.

The method may also mark (step 109) the node as requiring tokenization of sensitive data in the data aspects at runtime. Such tokenization results in removing the need for the constraints resulting in no restriction for the processing node. The processing node having such data to be tokenized may be marked (step 110) with metadata indicating its unrestricted or less restricted use.

Marking a node in step 109 as requiring tokenization may be marked at an inbound interface and at runtime a prior node may, prior to sending data, check the properties of the next node. Alternatively, an outbound interface of a prior node may be marked to indicate that a next node requires tokenization. On deployment, outbound interfaces of "secure" nodes that link to inbound interfaces of "insecure" nodes may be marked and tokenization may occur.

Optionally, the analysis may also access tracking data relating to aspects of messages which have restrictions applied and which have moved to target aspects of messages which are un-constrained. The target aspects may be tracked and corresponding constraints applied to their data.

Constraint tracking (step 106) of processing nodes may be provided. For example, a message model may be defined with restrictions, "model1". A message may be processed conforming to "model1" and a transform may transform the message from a "model1" message to a "model2" message. For illustration, "model2" may be a message model that has no annotations. The transform may move a restricted field from "model1" into an unrestricted field in "model2". Without the tracking, it may appear that the output message has no restricted data because there are no annotations when in fact the restricted field moved into the unrestricted field in "model2" from "model1" should be restricted as in "model1". The constraint tracking does not always require the data aspect to be accessed. For instance, the example here is a "move" operation and the value of the data aspect does not need to be known but the field that is tracked in the outbound model should now be treated as secure.

At deployment of the application, each processing node of the application may be deployed (step 107) according to restricting metadata.

As an alternative to the embodiment of the method described in FIG. 1, instead of the message model containing annotations of constraints to indicate data aspects which contain sensitive data and/or provide restrictions on the user of the data, the processing nodes themselves may be annotated manually with constraints to indicate that the data aspects contain sensitive data and/or to provide restrictions on the use of the nodes. The method of FIG. 1 may be adapted by removing the need to access the annotated message models in step 102 and instead reading metadata of the processing nodes indicating sensitive data aspects or deployment constraints. In this embodiment, message model annotations are still needed for the tokenization step at runtime, but at deployment time the message model annotations are not used. The developer would be marking nodes the developer knows or presumes to be processing data with constraints but message model annotations are still needed at runtime.

The analysis of what nodes process which data aspects and whether the nodes have constraints may be replaced by the developer just marking nodes the developer knows or presumes to be processing data with constraints. The analysis step would be more accurate as a security officer is applying the constraints and the developer may not have such an awareness of the detailed requirements of the constraints.

The developer may optionally override node constraints, for example, to indicate that a node should stay in a secure environment (whether tokenization would remove that constraint or not).

Figure 2:
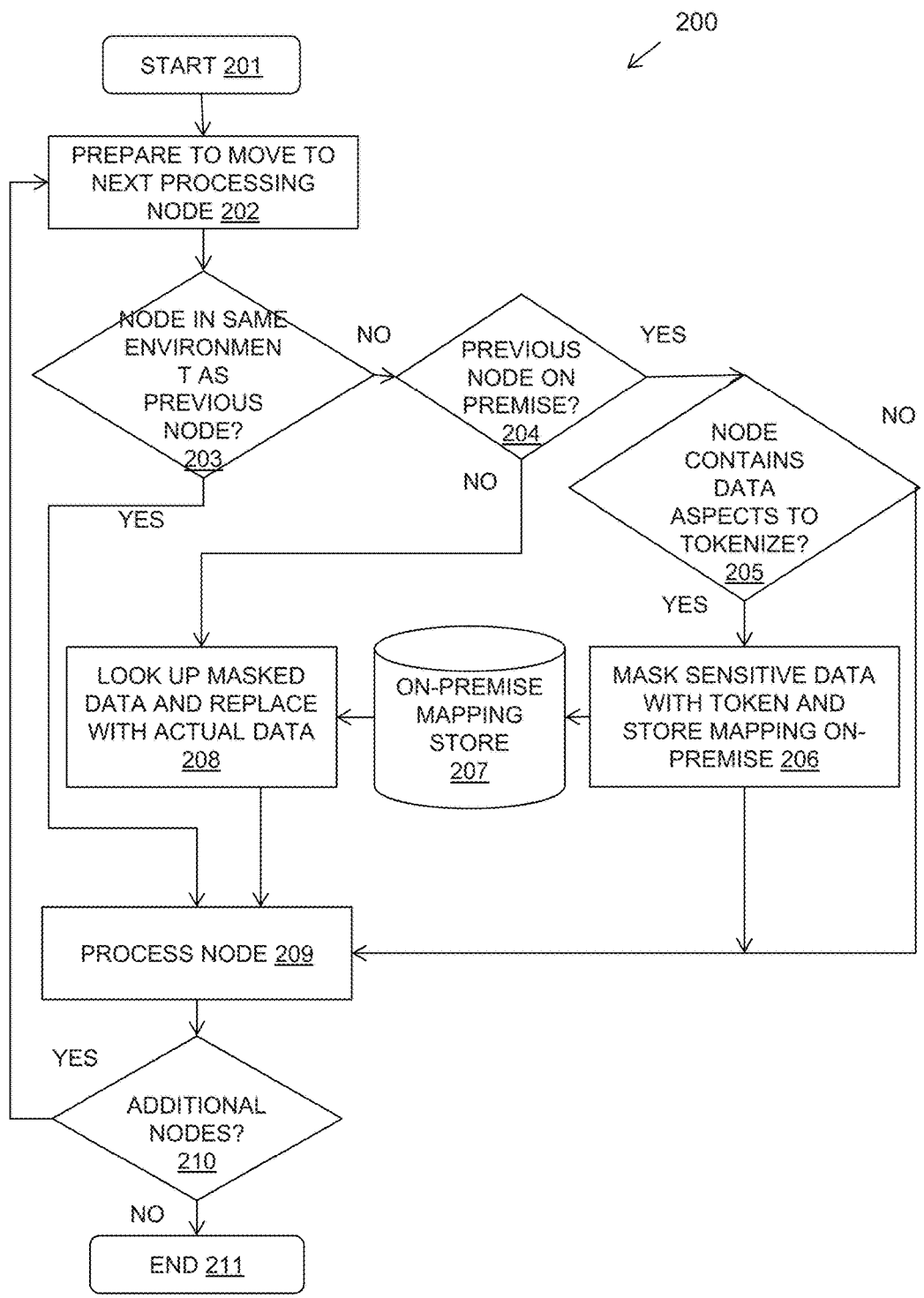
FIG. 2 is a flow diagram of an aspect of a method for processing data at processing nodes of the application at runtime of the application, in accordance with embodiments of the present invention.

FIG. 2 is a flow diagram 200 of an aspect of a method for processing data at processing nodes of the application at runtime of the application, in accordance with embodiments of the present invention. Once the application is deployed, different nodes are deployed in different locations. At runtime it is necessary to ensure that appropriate fields are tokenized when a message is moving between restricted and un-restricted environments.

The method may start (step 201) and proceed to prepare (step 202) a first/next processing node of the application.

The following method is performed prior to sending the data itself to the first/next processing node. The preparation stage queries the processing node properties to see if there is a need to tokenize data aspects prior to sending data. A tokenization point should have already been set on the node/interface prior to the node that is working on constrained data (but not accessing the node) in an insecure environment, but data will not be sent to the node to be processed until the node has been tokenized.

It may be determined (step 203) if the processing node is in the same environment as the previous processing node. If the processing node is in the same environment as the previous node (YES branch from step 203), then the node may be processed (step 209). If the processing has not moved from a particular deployment location, then there is no constrained data to tokenize. For example, if the environment is a cloud location, then any data there that is constrained is already tokenized and no new restricted data will be deployed.

However, if the processing node is not in the same environment as the previous node (NO branch from step 203), then it may be determined (step 204) if the previous node is on premise. If so (YES branch from step 204), it may be determined (step 205) if the processing node contains data aspects to be tokenized. If the processing node contains data aspects to be tokenized (YES branch from step 205), then the data aspects may be masked 206 with a token and a mapping may be stored 207 on premise. The processing node with the masked data aspect may then be processed (step 209). If the processing node does not contains data aspects to be tokenized (NO branch from step 205), then the node may be processed (step 209).

If it is determined at 204 that the previous node is not on premise (NO branch from step 204), when the node is processed any masked data in the previous node may be looked up (step 208) from the mapping, and the masked token may be replaced with the actual data. The node may then be processed (step 209).

After processing a node 209, it may be determined if there are additional nodes (step 210) and, if so (YES branch from step 210), the method may loop to step 202 to prepare the next processing node. If there are no additional processing nodes (NO branch from step 210), the method may end (step 211).

The method of FIG. 2 may also be performed in an intermediary step. For instance, going between secure and insecure environments, and vice-versa, may require a tunnel through any firewalls etc., sometimes referred to as a secure connector. One part of this intermediary step may be in the secure environment connected to the outbound interface and another part of this intermediary step may be in the insecure environment connected to the part on-premise and to the inbound interface of the subsequent node. The tokenization or annotation etc. may also occur in the secure connector in the secure environment.

In the following example illustration, a distributed application may be distributed across env1 and env2. Env1 is restricted and env2 is not restricted. Part1 of the application is in env1, part2 is in env2, and part3 is back in env1. The flow of logic in the application is that a message is received at part1, and processed and sent to part2. Tokenization of restricted data is performed prior to the message being sent to part2 and stored in env1. Part2 processes the message and the message is then sent on to part3. Part3 sees masked data in the message and as the masked data are back in the environment in which the masked data was stored (env1). The logic can retrieve the secure data and replace the tokens with the real values.

To summarize, a message model may have constraints on data aspects and a message may conform to the message model. On deployment of the integration, the location may be based on these constraints and the requirement for tokenization marked on the node. At runtime, metadata on the node stating the requirement for tokenization may then trigger tokenization at the appropriate point (when leaving the node en-route to another environment) and the constraints on the message model data aspects may be referenced to understand which data aspects of the message (which conforms to the message model and which may also reference data from constraint tracking) need to be tokenized at that point.

Figure 3:
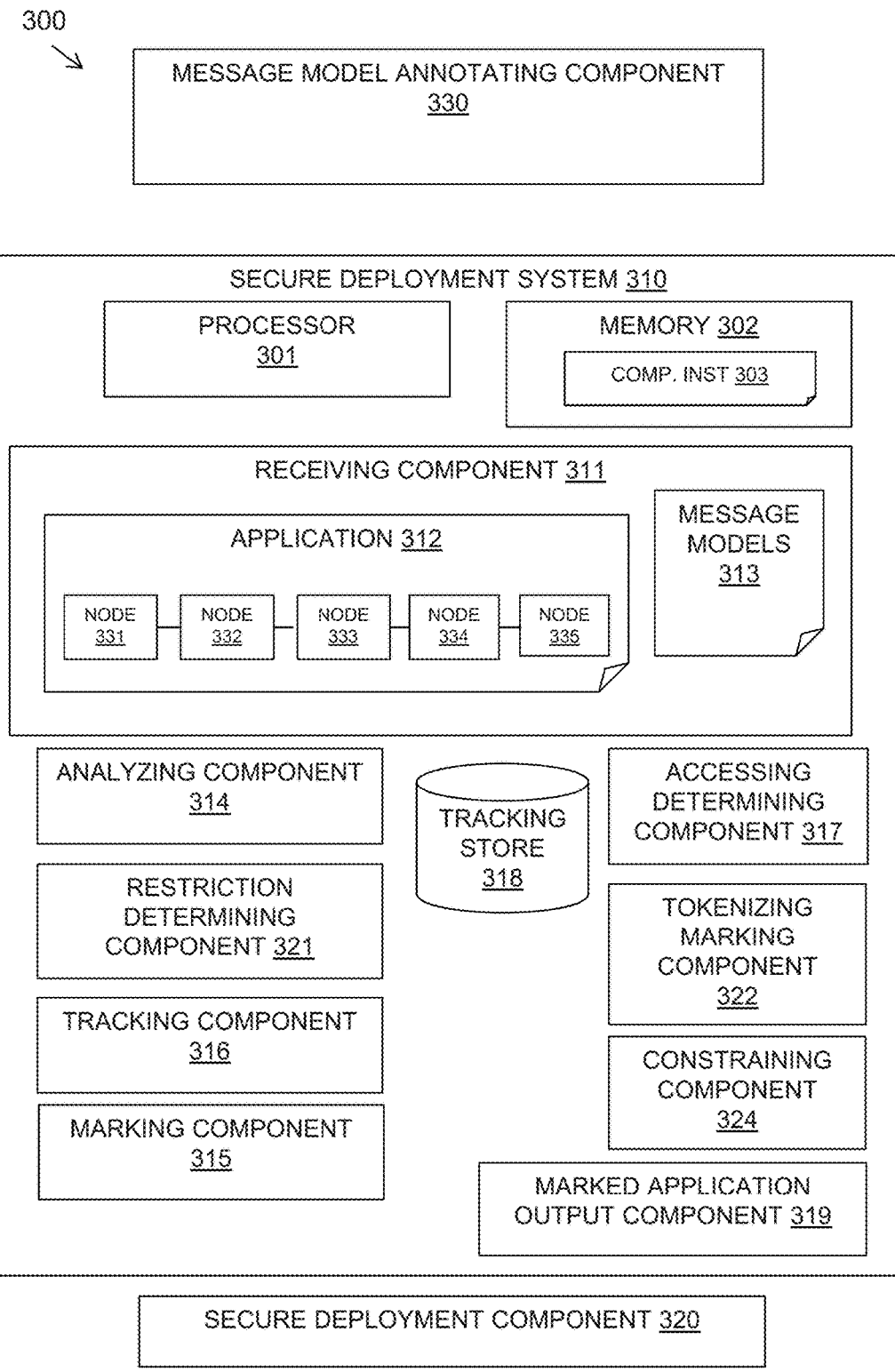
FIG. 3 is a block diagram of a data processing system comprising a secure deployment computer system, in accordance with embodiments of the present invention.

FIG. 3 is a block diagram of a data processing system 300 comprising a secure deployment computer system, in accordance with embodiments of the present invention. The data processing system 300 includes a secure deployment computer system 310. The secure deployment computer system 310 may be provided as part of a development system for application development or as part of a deployment system for application deployment across deployment locations. A secure deployment component 320 is shown separately in FIG. 3. However, the secure deployment component 320 may be incorporated as an output component of the secure deployment computer system 310 if the secure deployment component 320 is provided as a deployment system.

A message model annotating component 330 may be provided which may be separate from the secure deployment system 310 and provided as a user interface for an administrator to annotate message models with sensitive data and/or deployment constraints as described herein. The administrator may modify the message model in notepad or a similar tool, which may be separate from the application development.

The secure deployment computer system 310 may include one or more processors 301 and one or more memories 302 configured to provide computer program instructions 303 to the one or more processors 301 to execute the function of the following components arranged to provide the defined functionality.

The secure deployment computer system 310 may include a receiving component 311 arranged for receiving an application 312 for analysis wherein the application is capable of being divided into processing nodes 331-335 which may be deployed in different locations. The application 312 processes messages based on message models 313 having annotations defining constraints on the data in given data fields or structures of the message. An accessing determining component 317 may be provided for accessing the required message models 313.

The secure deployment system 310 may include an analyzing component 314 arranged for analyzing the application to identify processing nodes 331-335 that reference the given data fields or structures having constraints as defined by the annotations in the message models 313.

The secure deployment system 310 may include an accessing determining component 317 for determining if data aspects referenced in a processing node 331-335 of the application 312 are accessed during node processing. Access of a data aspect implies that the value of the data aspect is required for processing.

The secure deployment system 310 may include a constraining component 324 for, if one or more data aspects are accessed, determining a restriction for the processing node based on the deployment constraints of the accessed data aspects.

The secure deployment system 310 may include a tokenizing marking component 322 for marking processing nodes having constrained data aspects which may contain sensitive data requiring tokenization at runtime. The tokenization marking component 322 may also optionally annotate the message model 313 to indicate data aspects requiring tokenization at runtime.

The analyzing component 314 may also reference a tracking component 316 arranged for tracking data fields or structures having deployment constraints and determining if a data field or structure having deployment constraints is moved from a processing node 331-335. A tracking store 318 may be provided for recording that a moved data field or structure has deployment constraints.

The secure deployment computer system 310 may include a restriction determining component 321 for determining a restriction for a processing node based on the deployment constraints of the accessed data aspects or any remaining deployment constraints of processing nodes with tokenized data aspects.

In the embodiment in which the secure deployment computer system 310 is operated prior to deployment, the secure deployment computer system 310 may include a marking component 315 arranged for marking processing nodes 331-335 with restricting metadata corresponding to the deployment constraints annotated in the message model 313 relating to the data aspects accessed by the processing node. A marked application output component 319 may output the marked application to a separate deployment component 320, if required. The deployment component 320 may read the restricting metadata and deploy each processing node 331-335 according to the deployment constraints.

In the embodiment in which the secure deployment computer system 310 is operated at deployment of an application, the determining component 321 may output the determined restriction for a processing node to the secure deployment component 320 which may deploy the processing node accordingly.

Figure 4:
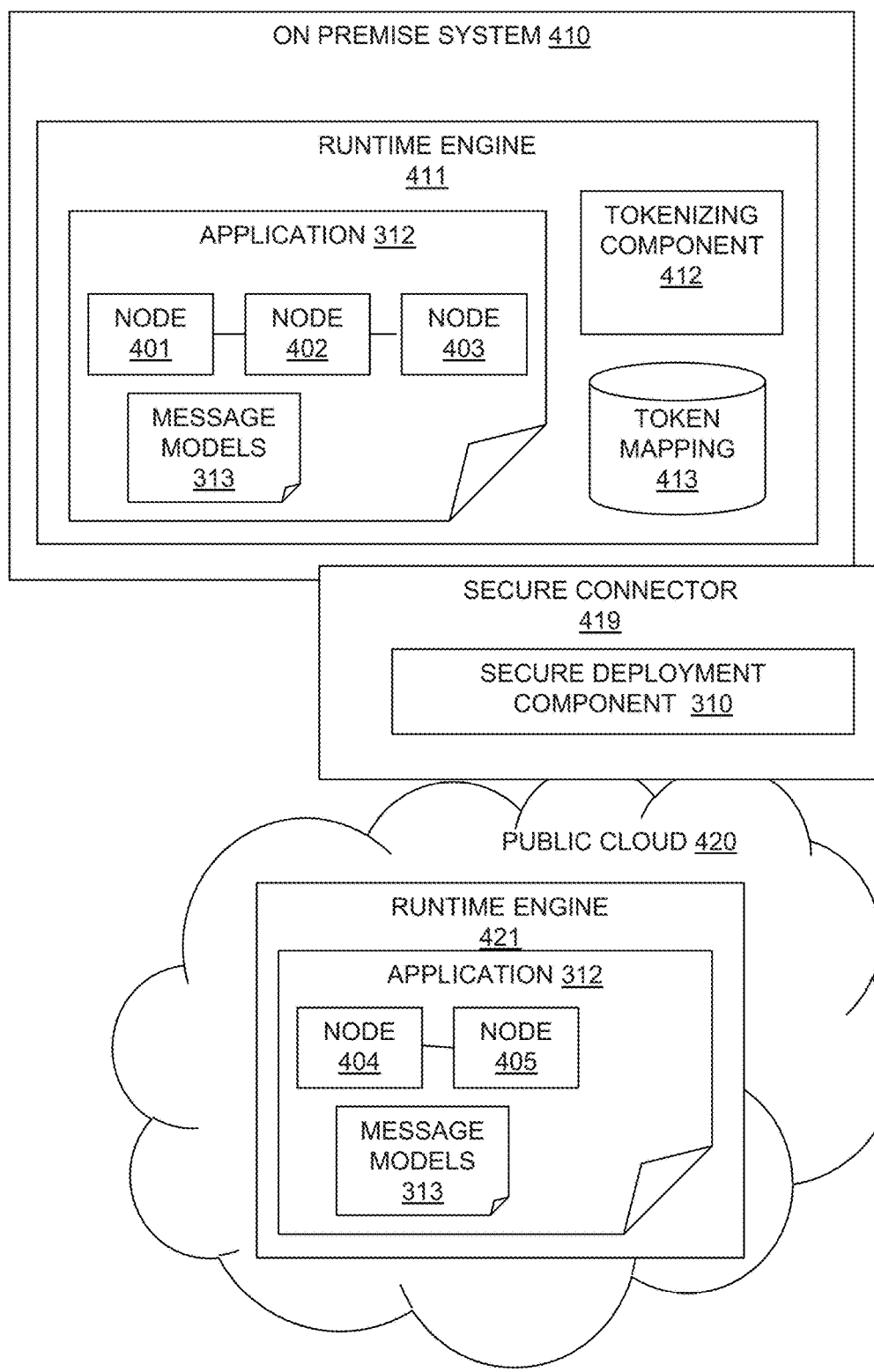
FIG. 4 is a block diagram of a software system, in accordance with embodiments of the present invention.

FIG. 4 is a block diagram of a software system 400, in accordance with embodiments of the present invention.

The software system 400 shown is an application 312 in the form of an integration application deployed across a hybrid cloud environment. For simplicity of illustration, the hybrid cloud environment is shown as an on premise system 410 and a public cloud 420.

The on premise system 410 and the public cloud 420 may have runtime engines 411, 421 respectively. The runtime engines 411, 421 run applications that are deployed to the runtime engines 411, 421. In one example embodiment, a runtime engine may be an integration server.

The application references libraries that may typically contain associated resources, such as the message models 313.

The application 312 has processing nodes 401-405 with associated message models 313.

Each of the nodes 401-405 may be executed in the runtime engine 411 on premise, and the runtime engine 421 may be executed on the public cloud (or other locations in a more complex arrangement). When the logic in the application 312 reaches a node 401-405, if the logic in the application 312 is to be performed on the public cloud 420 then a message and context that is being processed is sent to the runtime engine 421. If the logic in the application 312 is to be performed on the on premise system 410, then a message and context that is being processed is sent to the runtime engine 411 on the on premise system 410.

A secure connector 419 may be provided as a process running in a location (on-premise, in the cloud, or split between the two) that connects the runtime engine 411 on-premise to the runtime engine 421 in the cloud 420. Once the processing completes in the cloud runtime engine 421, control returns to the on-premise runtime engine 411. So the secure connector 419 is an external process in relation to the runtime engines 411, 421 invoked and connects the on premise runtime engine 411 to the runtime engine 421 in the cloud.

The secure deployment component 310 may be provided at the secure connector 419 and may read restricting metadata at a processing node 401-405 and determine which runtime engine 411, 421 the node may be deployed to.

In the situation where a processing node has data aspects requiring tokenization in order to be deployed in a public cloud 420, a tokenization component 412 may be provided together with a token mapping 413 at the on premise system 410, for example at the runtime engine 411, in order to tokenize sensitive data before a processing node is deployed in a public cloud 420 and in order to replace the token with the original data when a processing node is returned tothen on premise system 410.

An example is next provided illustrating the described method.

When describing a message structure with a message model (XML/DFDL schemas etc.) an administrator may additionally provide annotations setting restrictions on particular data structures or fields. The following example imposes a restriction on a field FIELD2 that the field FIELD2 does not leave the company firewall and that the data in the complex structure PERSONAL_DATA is not allowed to leave the country:

HEADER::
FIELD1::STRING
BODY::
FIELD2::STRING::ONPREM
PERSONAL_DATA::::COUNTRY
   FIELD3::INTEGER
   FIELD4::STRING
   FIELD5::STRING
FOOTER::
FIELD6::DATETIME

FIELD2 and PERSONAL_DATA fields/elements (including the sub-elements FIELD3, FIELD4 and FIELD5) have constraints. If a node has an interface with these fields (FIELD3, FIELD4 and FIELD5), the node must be executing in an appropriate environment. An interface may be inbound or outbound. If the interface is an outbound interface, the node may know the model for the message and the constraints without having to contact the subsequent node.

An integration flow developer may subsequently pull the message model into an integration flow that processes the messages described. When the application is completed and packaged or deployed, static analysis of the code may take place to determine what nodes of the application access fields, or process messages, with constraints imposed in the message model, which may advantageously additionally include tracking data that exits the message model, for example, taken from FIELD2 above and moved to a non-constrained field in another message model to make an outbound invocation.

The application nodes may then be marked based on the analysis to state where the application nodes may be deployed. The nodes acting on "ONPREM" constrained data may only be deployed to an on-premise environment.

The application processing nodes may be marked based on the analysis to state where the application nodes may be deployed: (i) if the restricted data aspects are directly accessed in an application node then the restriction on the message model may applied to the application node; (ii) if the application processing node was not directly accessing the restricted data aspect (i.e., that data is in the message being processed but is not accessed or required in that particular node), then the data aspect may be masked allowing the node processing to be executed in an environment beyond the constraints of the data aspect.

Figure 5B:
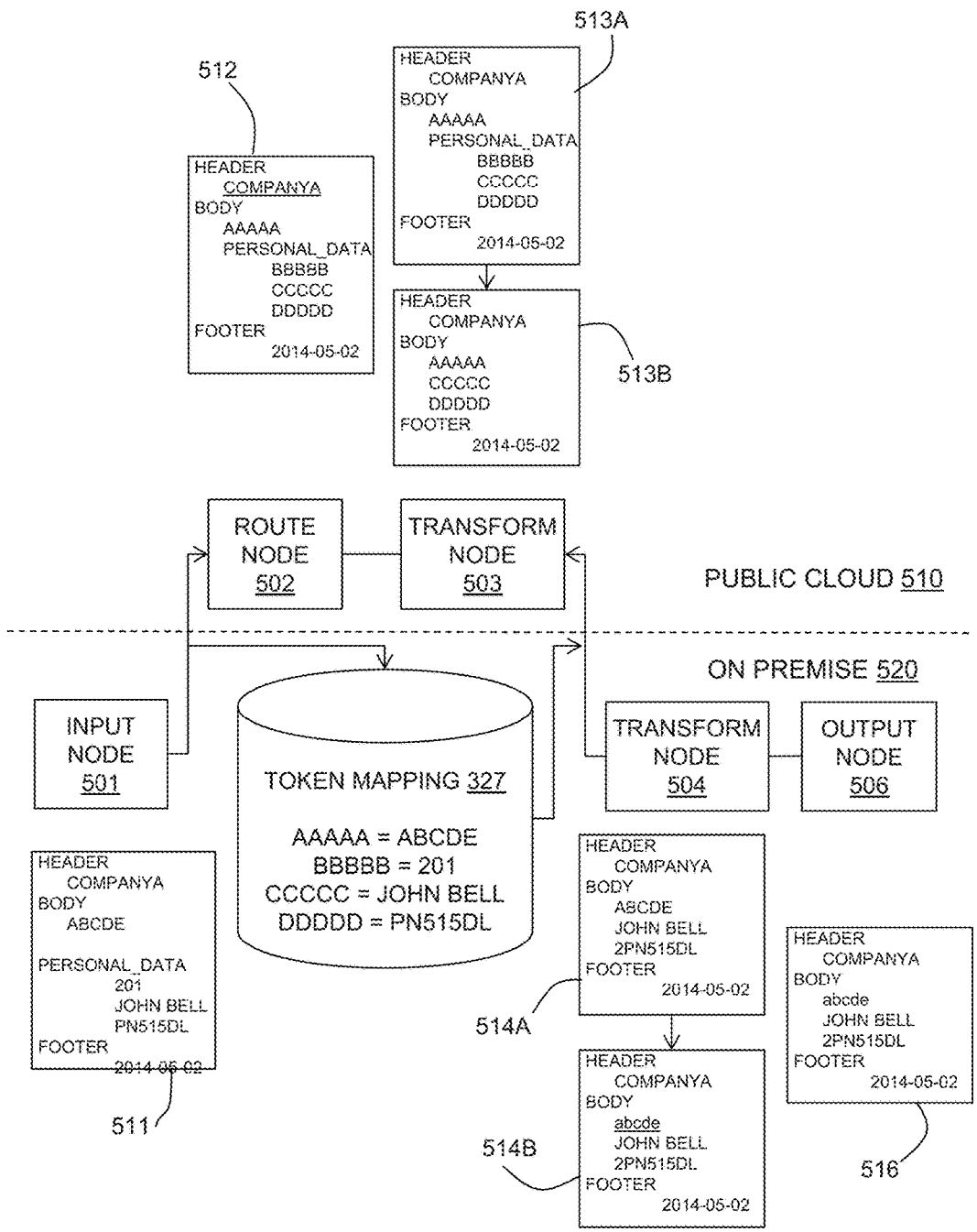

A first example integration and subsequent deployment is shown in FIGS. 5A and 5B.

FIGS. 5A and 5B are schematic diagrams of an example of a message flow deployment in an integration environment illustrating a method, in accordance with embodiments of the present invention.

The example embodiment shown in FIG. 5A of a message flow 500 of an integration through the nodes of input 501, route 502, first transform 503, second transform 504 and output 506. When message boxes are shown on top of (i.e., above) each other, this shows the message at the top being transformed to that at the bottom, or the message at the top being sent out to external service and that on the bottom being returned.

A message 511 is received at the input node 501 to the message flow. The message 512 is routed to node 502 based on the field underlined in the message 512. For simplicity the other paths that could be chosen from this point are not shown.

The message is transformed at the first transform node 503 from the message shown at the top 513A to that shown at the bottom 513B.

Fields that are underlined are fields that are acted upon, which may be accessed or moved. For example, in message 512, "COMPANYA" value is accessed but is not a restricted data aspect. In message 513A transformed to 513B, the fields are rearranged.

In the second transform node 504, the message 514A at the top includes a transform which accesses the value "ABCDE" and the output below 514B includes the transformed value "abcde".

The message 516 shown at the output node 506 is output from the integration.

The message models for the interfaces between the input node 501 and the route node 502 and between the route node 502 and the first transform node 503 have FIELD2 field and PERSONAL_DATA fields and elements (including sub-elements field3, field4 and field5) being constrained. So if a node has an interface with these fields the node must be executing in an appropriate environment unless the data aspects are not accessed and may therefore be tokenized.

FIG. 5B illustrates the outcome of the integration deployment of the message flow 500.

The route node 502 references the data aspect "PERSONAL_DATA", which is restricted to COUNTRY. Some data aspects within PERSONAL_DATA are moved as part of the transform to form a message conforming to the message model of the outbound interface.

However, although these fields "John Bell" and "PN515DL" have a constraint of COUNTRY these fields do not need to be accessed; as the transform is just moving them, and not altering them or requiring the value, tokenization can be used.

The first transform node 503 references data aspects that have constraints, i.e., FIELD2 which is constrained to ONPREM. However, it is determined by analysis that these data aspects are not accessed by the processing node, the first transform node 503. Therefore, the data aspects are tokenized and the data aspect values are replaced with tokens. A token mapping 327 is provided on premise 520 in which the constrained data values and the mapped tokens are stored.

In this example, FIELD2 of "ABCDE" is mapped to token "AAAAA", PERSONA_DATA of "201" is mapped to token "BBBBB", "JOHN BELL" is mapped to token "CCCCC", and "PN5 15DL" is mapped to token "DDDDD".

The route node 502 and first transform node 503 with the tokenized data aspects may be processed in the public cloud 510.

The second transform node 504 is accessing the constrained data aspect "ABCDE" and thus needs to be processed at on-premise 520. The constrained data aspects may be re-inserted when the processing returns on-premise. The second transform node 504 may then access the constrained data "ABCDE" in order to transform the constrained data "ABCDE" to "abcde".

The message flows could be used in a cloud environment if the geographical location of said the cloud environment was known or could be specified, or could not be sent to a database (for instance) if the location of the database was unknown or outside of the geographical constraint. Under such circumstances, the data would not be sent (stripped from the content), which could potentially cause an error in the application reported back to administrators/developers.

Although the above implementation and description is based on an integration application, the methods are more broadly applicable to any application that may be broken into constituent parts.

Also, the implementation is not limited to on-premise to cloud configurations and may be all on-premise or all on-cloud in which the transfer is between data centers such as on-premise datacenters or datacenters underpinning a cloud infrastructure, in different geographic locations or with different security features or restrictions.

Figure 6:
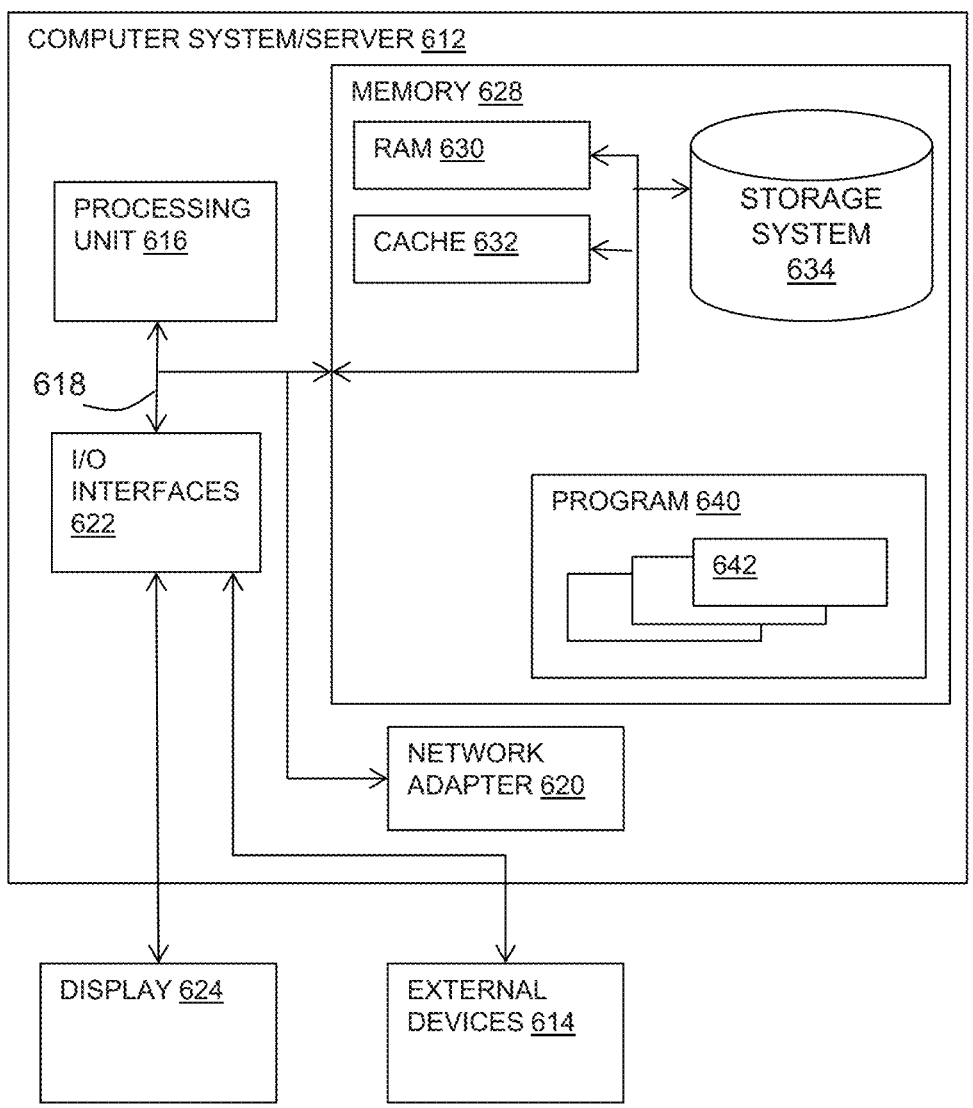
FIG. 6 is a block diagram of an embodiment of a computer system or cloud server in which the present invention may be implemented.

FIG. 6 is a block diagram of an embodiment of a computer system or cloud server in which the present invention may be implemented.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
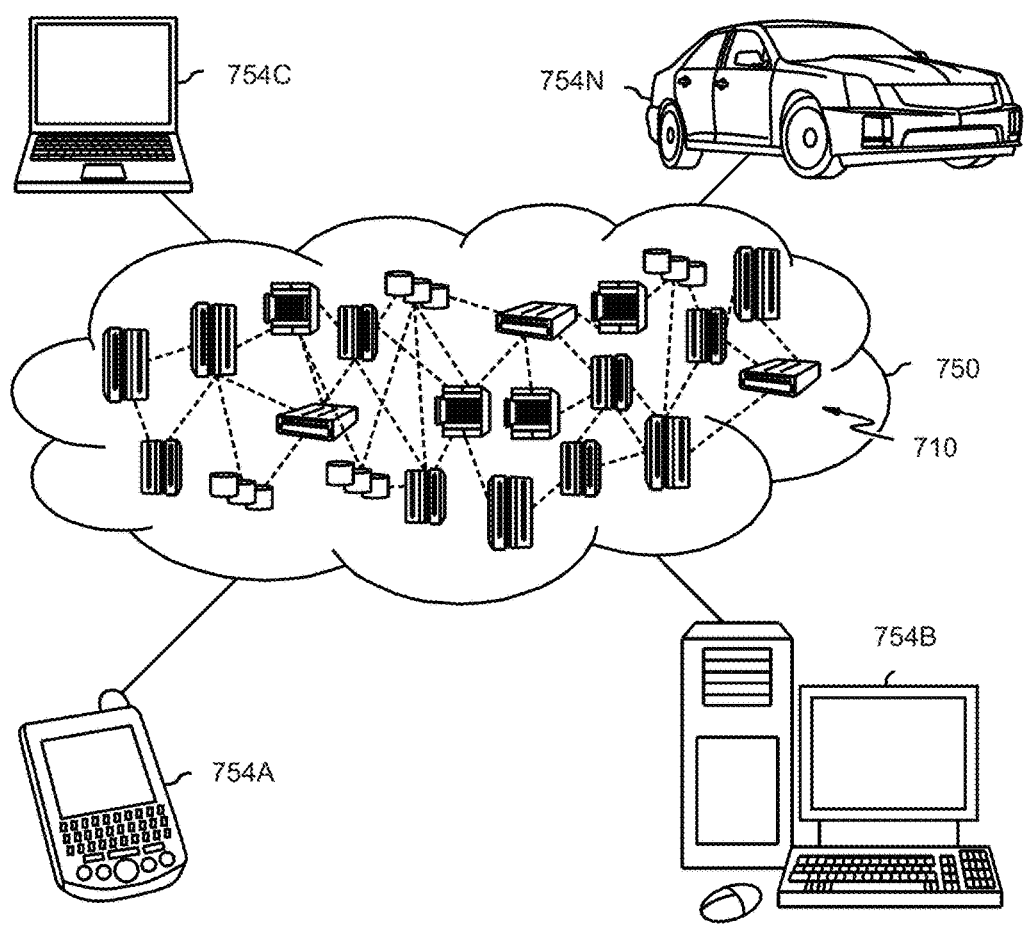
FIG. 7 depicts a cloud computing environment according to an embodiment of the present invention.

FIG. 7 depicts a cloud computing environment 750 according to an embodiment of the present invention. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
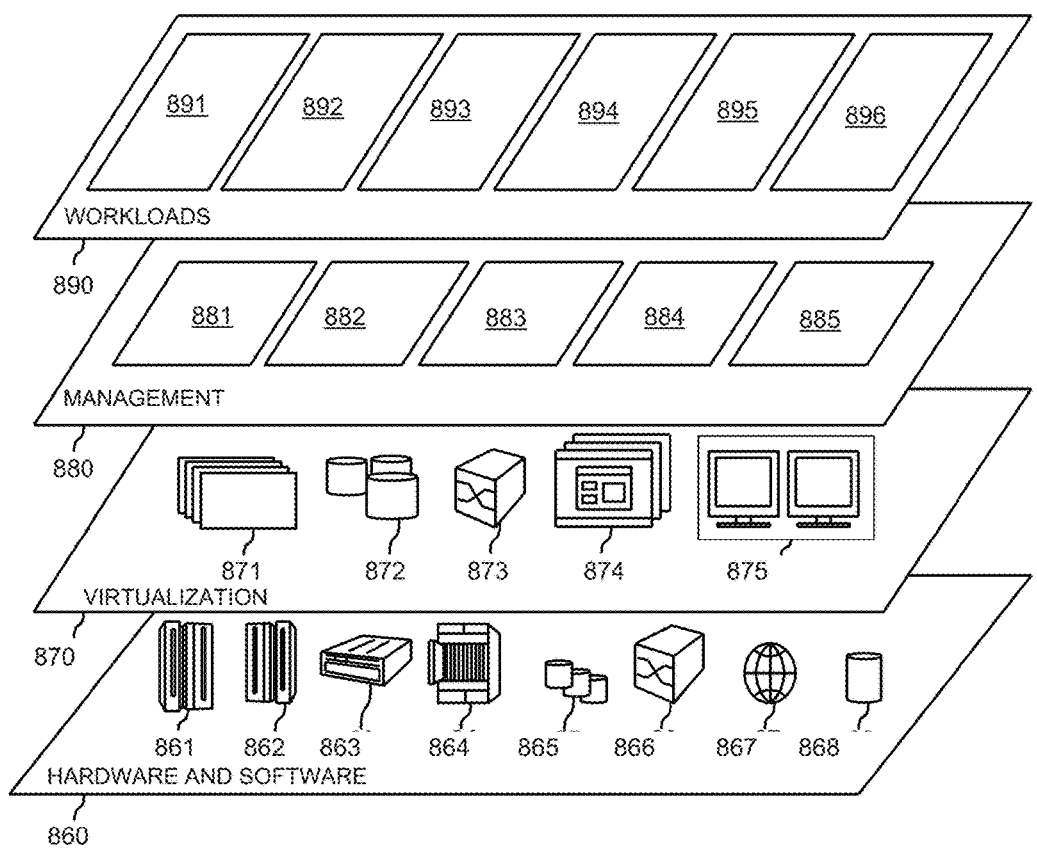
FIG. 8 depicts abstraction model layers of a cloud computing environment according to an embodiment of the present invention.

FIG. 8 depicts abstraction layers of a cloud computing environment 750 (FIG. 7) according to an embodiment of the present invention. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892: virtual classroom education delivery 893; data analytics processing 894; transaction processing 895; and deployment and connection functionality 896 for secure deployment across deployment locations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for secure message handling of an application across deployment locations, said method comprising:

dividing, by one or more processors of a computer system, the application into multiple processing nodes which process messages and which can be deployed in multiple different locations, wherein the application processes a message comprising a plurality of data aspects, wherein each data aspect in the message includes aspect data having a data aspect value in one or more fields in the message, and wherein one or more data aspects of the plurality of data aspects include respective deployment constraints on locations in which the aspect data in the one or more data aspects is deployed;

said one or more processors analyzing the application to identify one or more processing nodes of the multiple processing nodes that reference the one or more data aspects;

said one or more processors ascertaining whether the one or more data aspects are accessed by an identified processing node of the multiple processing nodes, wherein access to each data aspect of the one or more data aspects requires a data aspect value of said each data aspect of the one or more data aspects to be known;

if said ascertaining ascertains that the one or more data aspects are accessed by the identified processing node, then said one or more processors determining a restriction for the identified processing node based on the respective deployment constraints included in the accessed one or more data aspects and deploying the identified processing node according to the determined restriction for the identified processing node;

if said ascertaining ascertains that none of the one or more data aspects are accessed by the identified processing node, then said one or more processors marking the identified processing node or a preceding processing node that precedes the identified processing node to indicate a required tokenization of the one or more data aspects, said tokenization removing the deployment constraints for the identified processing node.

2. The method of claim 1, wherein annotations indicating handling constraints on the handling of data in the given data aspects are provided as metadata of a processing node of the multiple processing nodes, and wherein the handling constraints are provided in the message processed by the application.

3. The method of claim 1, wherein said ascertaining ascertains that the one or more data aspects are not accessed by the identified processing node, and wherein said marking comprises marking the identified processing node or the preceding processing node to indicate that the required tokenization marks an output interface of a previous node or an input interface of the processing node.

4. The method of claim 1, wherein said ascertaining ascertains that the one or more data aspects are not accessed by the identified processing node, and wherein said marking comprises marking the identified processing node or the preceding processing node to indicate the required tokenization results in tokenizing the one or more data aspects at runtime by replacing the data aspect value of each data aspect of the one or more data aspects with a token and providing a mapping between the token and the data aspect value, wherein the mapping is stored at a secure location.

5. The method of claim 1, wherein said ascertaining ascertains that the one or more data aspects are not accessed by the identified processing node, and wherein the method comprises:

said one or more processors determining at runtime that the preceding processing node was deployed in an unconstrained environment.

6. The method of claim 1, wherein said ascertaining ascertains that the one or more data aspects are not accessed by the identified processing node, and wherein the method comprises:

said one or more processors determining at runtime that a subsequent processing node that is after the identified processing node is deployed in a less secure environment and determining said the subsequent processing node is marked to indicate the required tokenization.

7. A computer system, comprising one or more processors, one or more memories, and one or more computer readable hardware storage devices, said one or more hardware storage device containing program code executable by the one or more processors via the one or more memories to implement a method for secure message handling of an application across deployment locations, said method comprising:

said one or more processors dividing the application into multiple processing nodes which process messages and which can be deployed in multiple different locations, wherein the application processes a message comprising a plurality of data aspects, wherein each data aspect in the message includes aspect data having a data aspect value in one or more fields in the message, and wherein one or more data aspects of the plurality of data aspects include respective deployment constraints on locations in which the aspect data in the one or more data aspects is deployed;

said one or more processors analyzing the application to identify one or more processing nodes of the multiple processing nodes that reference the one or more data aspects;

said one or more processors ascertaining whether the one or more data aspects are accessed by an identified processing node of the multiple processing nodes, wherein access to each data aspect of the one or more data aspects requires a data aspect value of said each data aspect of the one or more data aspects to be known;

if said ascertaining ascertains that the one or more data aspects are accessed by the identified processing node, then said one or more processors determining a restriction for the identified processing node based on the respective deployment constraints included in the accessed one or more data aspects and deploying the identified processing node according to the determined restriction for the identified processing node;

if said ascertaining ascertains that none of the one or more data aspects are accessed by the identified processing node, then said one or more processors marking the identified processing node or a preceding processing node that precedes the identified processing node to indicate a required tokenization of the one or more data aspects, said tokenization removing the deployment constraints for the identified processing node.

8. The computer system of claim 7, wherein annotations indicating handling constraints on the handling of data in the given data aspects are provided as metadata of a processing node of the multiple processing nodes, and wherein the handling constraints are provided in the message processed by the application.

9. The computer system of claim 7, wherein said ascertaining ascertains that the one or more data aspects are not accessed by the identified processing node, and wherein said marking comprises marking the identified processing node or the preceding processing node to indicate that the required tokenization marks an output interface of a previous node or an input interface of the processing node.

10. The computer system of claim 7, wherein said ascertaining ascertains that the one or more data aspects are not accessed by the identified processing node, and wherein said marking comprises marking the identified processing node or the preceding processing node to indicate the required tokenization results in tokenizing the one or more data aspects at runtime by replacing the data aspect value of each data aspect of the one or more data aspects with a token and providing a mapping between the token and the data aspect value, wherein the mapping is stored at a secure location.

11. A computer program product, comprising one or more computer readable hardware storage devices having computer readable program code stored therein, said program code containing instructions executable by one or more processors of a computer system to implement a method for secure message handling of an application across deployment locations, said method comprising:

said one or more processors dividing the application into multiple processing nodes which process messages and which can be deployed in multiple different locations, wherein the application processes a message comprising a plurality of data aspects, wherein each data aspect in the message includes aspect data having a data aspect value in one or more fields in the message, and wherein one or more data aspects of the plurality of data aspects include respective deployment constraints on locations in which the aspect data in the one or more data aspects is deployed;

said one or more processors analyzing the application to identify one or more processing nodes of the multiple processing nodes that reference the one or more data aspects;

said one or more processors ascertaining whether the one or more data aspects are accessed by an identified processing node of the multiple processing nodes, wherein access to each data aspect of the one or more data aspects requires a data aspect value of said each data aspect of the one or more data aspects to be known;

if said ascertaining ascertains that the one or more data aspects are accessed by the identified processing node, then said one or more processors determining a restriction for the identified processing node based on the respective deployment constraints included in the accessed one or more data aspects and deploying the identified processing node according to the determined restriction for the identified processing node;

if said ascertaining ascertains that none of the one or more data aspects are accessed by the identified processing node, then said one or more processors marking the identified processing node or a preceding processing node that precedes the identified processing node to indicate a required tokenization of the one or more data aspects, said tokenization removing the deployment constraints for the identified processing node.

12. The computer program product of claim 11, wherein annotations indicating handling constraints on the handling of data in the given data aspects are provided as metadata of a processing node of the multiple processing nodes, and wherein the handling constraints are provided in the message processed by the application.

13. The computer program product of claim 11, wherein said ascertaining ascertains that the one or more data aspects are not accessed by the identified processing node, and wherein said marking comprises marking the identified processing node or the preceding processing node to indicate that the required tokenization marks an output interface of a previous node or an input interface of the processing node.

14. The computer program product of claim 11, wherein said ascertaining ascertains that the one or more data aspects are not accessed by the identified processing node, and wherein said marking comprises marking the identified processing node or the preceding processing node to indicate the required tokenization results in tokenizing the one or more data aspects at runtime by replacing the data aspect value of each data aspect of the one or more data aspects with a token and providing a mapping between the token and the data aspect value, wherein the mapping is stored at a secure location.

* * * * *